United States Patent

Davidge et al.

[15] 3,660,616

[45] May 2, 1972

[54] DICTATING AND TRANSCRIBING SYSTEMS FEATURING RANDOM SENTENCE ARRANGEMENT WITH RECOGNITION AND LOCATION OF SENTENCES IN A PREFERRED SEQUENCE

[72] Inventors: Ronald V. Davidge; Robert A. Kolpek, both of Lexington, Ky.

[73] Assignee: International Business Machines Corporation, Armonk, N.Y.

[22] Filed: June 29, 1970

[21] Appl. No.: 50,577

[52] U.S. Cl...........179/100.2 MD, 179/100.2 B, 179/100.2 S, 340/172.5

[51] Int. Cl. ......................................G06f 7/00, G11b 27/08

[58] Field of Search...........179/100.2 MD, 100.2 S, 100.2 B, 179/84; 340/172.5, 174.1 J; 197/19, 20

[56] References Cited

UNITED STATES PATENTS

| | | | |
|---|---|---|---|
| 3,423,743 | 1/1969 | Silverman | 179/100.2 MD |
| 3,248,705 | 4/1966 | Dammann et al | 340/172.5 |
| 3,460,120 | 8/1969 | Lichowsky | 179/100.2 MD |
| 3,222,460 | 12/1965 | Albanes | 179/100.1 DR |

*Primary Examiner*—Bernard Konick
*Assistant Examiner*—Jay P. Lucas
*Attorney*—Hanifin and Jancin and D. Kendall Cooper

[57] ABSTRACT

The invention concerns a dictating system capable of the random recording and arrangement of audio segments, means for digitally recording the positions of such segments after the completion of such arrangement either upon an additional medium or upon the recording medium in a separate track or tracks reserved for such purposes or in locations corresponding to each audio segment giving the location of the next audio segment as defined by the arrangement, or for transmitting such information over a wire or wireless channel; and also concerns a transcription device for use with the above system, either capable of reading such digital information into memory before the beginning of the transcription process or capable of reading information giving the location of the next audio segment as defined by the arrangement during the transcription process, and having means for accessing audio segments on the medium recorded by the above system in the order of the arrangement.

4 Claims, 14 Drawing Figures

INVENTORS
RONALD V. DAVIDGE
ROBERT A. KLOPEK

BY: D. Kendall Cooper
ATTORNEY

RECORDER-VERSION IIa

CODE RECORDING CONTROL CIRCUIT
RECORDER VERSION IIa

TRANSCRIBER - VERSION II

RECORDER - VERSION III

TRANSCRIBER – VERSION III

DICTATING AND TRANSCRIBING SYSTEMS FEATURING RANDOM SENTENCE ARRANGEMENT WITH RECOGNITION AND LOCATION OF SENTENCES IN A PREFERRED SEQUENCE

CROSS REFERENCES

U. S. Pat. Application Ser. No. 50,683 filed concurrently herewith, with Robert A Kolpek as inventor, and entitled, "-Sentence Oriented Dictation System Featuring Random Accessing of Information in a Preferred Sequence under Control of Stored Codes."

U. S. Pat. Application Ser. No. 50,605 filed concurrently herewith, with Robert A. Rahenkamp and William R. Stewart Jr., and entitled "Sentence Oriented Dictation System Featuring Random Accessing of Dictation Segments."

BACKGROUND OF THE INVENTION AND PRIOR ART

Heretofore, it has been customary for a dictator to dictate material on a record medium, such as a magnetic belt medium with the dictation generally following a particular sequence. Some provision is normally made while the dictator is dictating for him to backspace the transducer and media relative to one another, to listen to material just dictated and perhaps to record over such material if desired. In accordance with the sentence oriented dictating system taught in the Kolpek, et al., application referred to above, provision is made on a magnetic belt media for the arrangement of sentences and paragraphs on tracks of a medium generally in the order dictated by the dictator but further providing for the rearrangement of sentence segments from one track to another, as well as rearrangement of paragraphs if desired. Thus, prior to any transcription operation, it is possible for the dictator to rearrange his thoughts, i.e. sentences in any desired manner that he may wish. The Kolpek, et al., system has provision for remembering the proper sequence of tracks, i.e., sentences, and plays to the dictator the sentences in a proper sequence regardless of any arrangement they may have on the medium. During the process of dictation, and upon termination of each sentence, a tone is recorded in each track following the sentence just dictated and the transducer is stepped to a new track in preparation for another sentence. A keyboard is provided for the purpose of locating the sentences and paragraphs under manual control of the operator.

The manipulation and rearrangement of sentence segments in the Kolpek, et al, system is primarily under control of the dictator. It is desirable that some provision be made for the transcribing of such information by an operator using a separate piece of equipment and having the capability of accessing all of the sentence segments on the record medium in the proper sequence regardless of how randomly rearranged they may be.

BRIEF SUMMARY OF THE INVENTION

In accordance with the present invention, digital information concerning sentence location is carried from the dictator's machine to the transcription machine along with the original randomly accessible medium. This may be done in several alternative ways.

One system described herein includes provision for using a punched card containing the digital information concerning sentence locations. When the dictator finishes recording and arranging sentence segments, he depresses a termination button on the keyboard. The digital sentence location information from the memory is then recorded on the card by a punch.

The transcription unit contains a random access carriage and medium drive mechanism similar to that of the generating machine. This unit is driven by a card reader to present sentences in the order indicated by the card. Secretarial control over the playback of information, stepping the card reader forward and backward is provided. The playback signal from the carriage is fed through an audio amplifier to a headset for transcription.

In another version, the originating machine may be modified for magnetically recording digital codes representative of sentence locations on the medium itself. All of the digital codes giving sentence locations may be recorded in a single track or group tracks set aside for this purpose. A digital code may also be placed before each audio track to represent the location of the next sentence in the final arrangement.

In still another version, the transcription device may be equipped with a memory capable of storing all the digital information from the digital track. Before transcription begins, this information is fed into the memory. A control unit then operates an access drive to present the sentence sequence stored in memory while the audio output of the magnetic head is supplied through an audio amplifier.

An additional magnetic head can be positioned to read the line of digital information. The output of this head goes through digital reading logic to selection logic. As audio material is being played back, all of the sentence location codes are fed through the selection logic. A line counter conditions this logic to send the appropriate code for the next sentence to the control unit.

Alternately, the digital information can be sent by means of a wire or wireless channel from the generating machine to the transcription machine.

As contemplated, the punched card could be replaced by a magnetic card reserved for this purpose. The recording medium can be a magnetic belt, tape, card or disk with the required digital information recorded either in a given track or tracks reserved for this purpose, or with information locating succeeding audio segments recorded adjacent to each audio segment.

OBJECTS

The primary object of the present invention is to provide a system configuration enabling the recording to information in segments, such as sentences, as they occur to the dictator and in any random sequence on a record media with facilities for locating the segments of information in a desired order.

Another object of the invention is to provide a sentence oriented system with provision for processing segments of information that are randomly arranged but having facilities for generating, recognizing, and locating the sentence segments in any preferred order for subsequent playback or transcription purposes.

Another object of the present invention is to provide a sentence oriented dictation and transcribing system having facilities for storing in a memory digital representations of sentence segments that are randomly arranged on a record medium and for controlling the apparatus to enable the efficient transcribing of such information in a preferred order and in an automatic manner.

The foregoing and other objects, features, and advantages of the invention will be apparent from the following more particular description of various preferred embodiments of the invention as illustrated in the accompanying drawings.

DRAWINGS

FIG. 1 and related FIGS. 2 and 3 illustrate a sentence oriented dictation system for recording sentence segments on a magnetic belt record medium in a random fashion and having provision for storing the locations of such segments and for preparing a separate medium to indicate the proper order of transcription of such segments.

DETAILED DESCRIPTION

The systems set forth herein provide for generating and transmitting information concerning the location of sentences randomly arranged on a previously dictated record medium and for the playing back of this audio information from a transcribing unit in the identical order to the dictator's final arrangement in the dictation unit.

Figure 1:
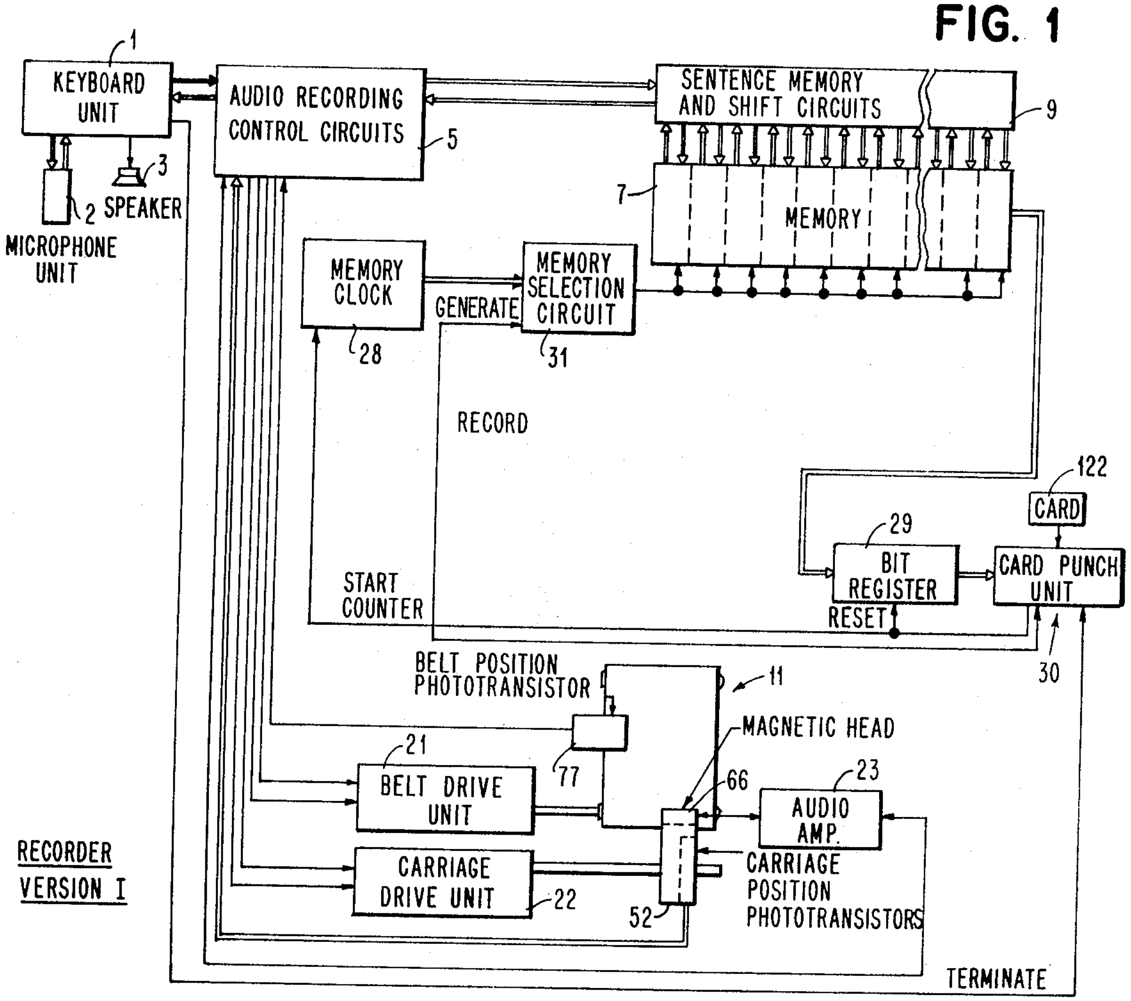
Figures 2, 3:
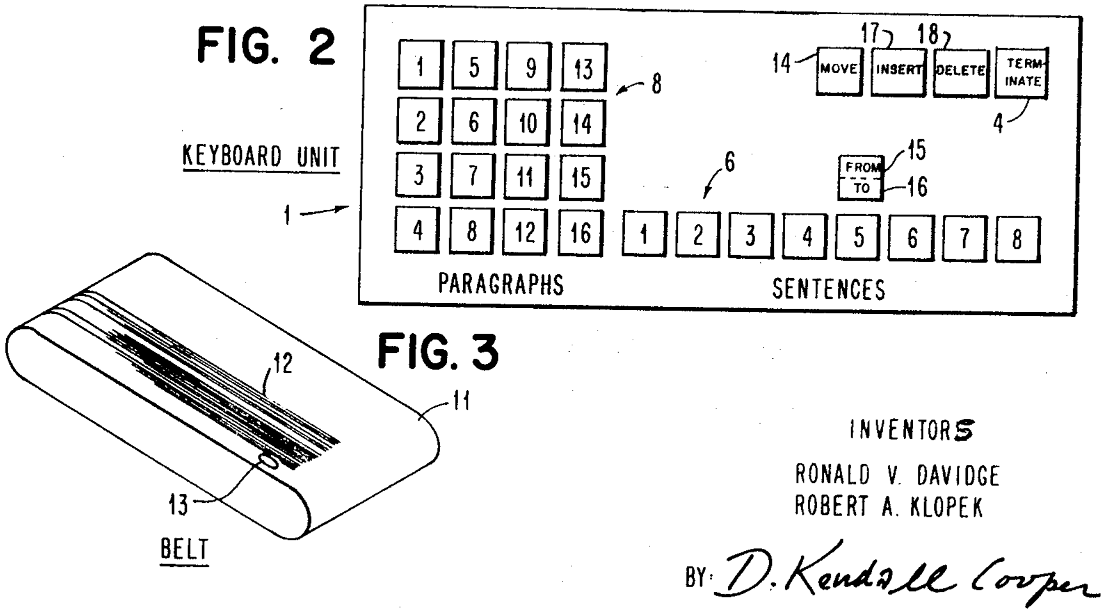

FIG. 1 is a block diagram of a first version of a recorder unit, while FIGS. 2–3 show, in more detail, the components of this unit. The dictator uses microphone unit 2 and keyboard unit 1 (shown in FIG. 2) to record audio information on magnetic belt 11 driven by belt drive unit 21, by means of magnetic head 66 mounted on carriage 52 which, in turn, is driven by carriage drive unit 22. Each sentence is placed on a separate track on the magnetic belt, and each of these tracks are represented by a bit register in memory 7. As sentences are recorded on the belt tracks, binary numbers representing their location in the sentence arrangement are placed in the registers in memory 7 corresponding to the tracks in which they are recorded. As taught in the cross-referenced U.S. Pat. application Ser. No. 50,683, the dictator may insert, delete, and rearrange recorded material through the use of keyboard unit 1. Recorded sentences are not rearranged on the belt, but rather the binary coder stored in memory representing the locations of sentences affected by rearrangements are changed to reflect each new arrangement. This changing of numbers is handled by shifting the queuing order of the audio segments between sentence memory 9 and main memory 7, under the control of audio recording control circuits 5, which also control the belt and carriage drive units 21 and 22 and the audio amplifier 23 connected to the magnetic head 66 during the audio recording process.

When the dictator is through recording and when he is satisfied with his arrangement of sentences and paragraphs, he depresses the terminate button 4 on the keyboard (see FIG. 2). This action starts the card punch unit 30, which, in turn, starts the memory clock 28 which drives memory selection circuit 31. This selects the first location in memory which contains the code identifying the first sentence in the last arrangement.

This code is placed in the bit register 29, which drives card punch 30, punching representations of the codes in card 122. Since the memory maintains codes representing the audio recording segments in the proper sequence, the first code punched in the card represents the track on which the first sentence in the final arrangement chosen by the dictator is located, the second code represents the track on which the second sentence in this arrangement is located. Each time the punch completes punching the segment location, it causes the clock to start another readout cycle from the memory until all used segments have been recorded. All unused segments are automatically omitted.

FIG. 2 shows the keyboard unit 1 used by the dictator. Sentence buttons 6 and paragraph buttons 8 are used to achieve random access to the recorded material and are lighted to indicate the exact position at which material is being recorded. The dictator normally indicates the ends of sentences and paragraphs by depressing switches (not shown) on microphone unit 2. If he wants to move a sentence or paragraph from one location to another, he depresses the Move button 14 illuminating indicator 15. He then depresses the sentence or paragraph button corresponding to the material he wants to move, turning off indicator 15 and illuminating indicator 16. He then depresses the sentence or paragraph button corresponding to the location to which he wants to move the material, completing the transfer operation and turning off indicator 16. When the dictator wants to insert material, he depresses Insert button 17. He then depresses the paragraph and sentence buttons corresponding to the position at which he wants to insert material and dictates in the normal manner. When he is through inserting, he can go to any other position by depressing the appropriate sentence and paragraph buttons. If the dictator wants to delete material, he depresses the Delete button 18 and then the sentence or paragraph button corresponding to the undesired material. When the dictator is through recording and rearranging, he depresses Terminate button 4 activating the recording of digital codes representing the locations of sentences on belt 11 according to his final arrangement.

Referring to FIG. 3, the magnetic belt medium has a multiplicity of tracks 12 spaced across its width, each of which may be used for recording a single sentence. All tracks start at the same position relative to the length of the belt. Hole 13, which is sensed by a phototransistor in the machine, indicates this starting position. Sentences will vary in length and a constant frequency tone is recorded in each sentence track to indicate the end of each sentence during the recording process.

Figures 4, 5:
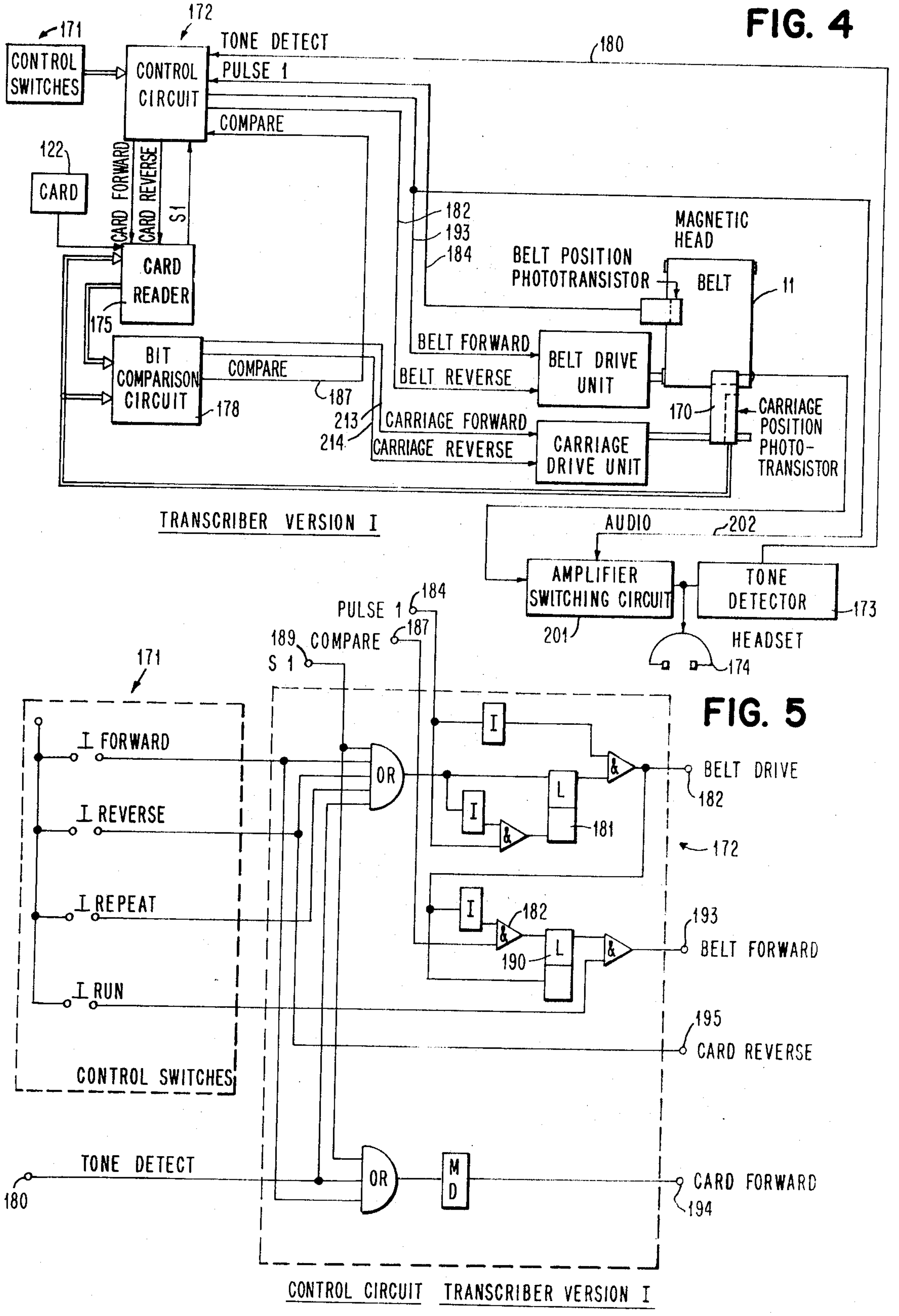
FIG. 4 illustrates a transcriber system utilizing the magnetic belt medium of FIG. 1 as well as the digital card information generated in the system of FIG. 1 to enable transcription of the randomly arranged sentence segments in a preferred sequence.
FIG. 5 is a control circuit for the transcribing system of FIG. 4.

FIG. 4 shows the transcriber used for playing back audio recorded by the device shown in FIG. 1, under the control of the secretary. The recorded belt 11 is placed as shown in the machine, which has a belt drive unit, a carriage and carriage drive unit, and phototransistors as described with reference to FIG. 1. The punched card 122 is placed in a card reader 175. Since the codes in the card represent in order the locations of sentences on belt 11 according to the dictator's final arrangement, stepping the card forward or backward in the reader provides the sentence location information needed to step forward or backward in this arrangement.

This machine uses tones recorded at the ends of sentences on belt 11 as previously described to determine when the card should be stepped to the next code for the next sentence location. This is done by playing audio information through tone detector 193 as well as headset 174. Each new code is read in card reader 175 as are the outputs of the carriage position phototransistors. Bits from the card code and from the phototransistor code are fed simultaneously into bit comparison circuit 178, which determines which of these binary codes represents a higher number, i.e., in which direction the carriage 170 should be moved to locate the next sentence on belt 11. This circuit also produces an output on line 187 when and only when these codes match perfectly, i.e., when the desired sentence location is reached. The carriage drive unit is operated in the direction indicated by binary comparator 177 until an output occurs on line 187.

FIG. 5 shows the control switches 171 used by the secretary to proceed through the belt in the order in which the dictator finally placed his sentences. To initiate operation, she depresses the Run button. If she releases this button, the machine stops. When she depresses the Forward button, the machine goes to the next sentence as defined. When she presses the Reverse button, the machine goes to the previous sentence as defined by the card. When she depresses the Repeat button, she goes back to the start of the sentence to which she is listening and plays that sentence over. Any or all of the switches could be placed on a foot pedal.

FIG. 5 also shows the control circuit 172 used to control the device during the playback of audio information, as indicated by a pulse on line 180. When a tone is detected as shown or when one of the switches, forward, reverse, or repeat is depressed, latch 181 is set causing the belt to be driven through line 182. When a pulse from the belt position phototransistor occurs on line 184, indicating that the position in which sentences are started has been reached, this latch is reset stopping the reverse motion of the belt.

The depression of the Forward switch or the detection of a tone also produces an output on line 194 which steps the card forward so the next code can be read, and the depression of the reverse switch produces an output on line 195, stepping the card in a backward direction. In either case, the card reader 175 and comparison circuits 177 and 178 function as previously described briefly with reference to FIG. 4. When the proper track is reached, an input to the control circuit appears on line 187 from the bit comparison circuit 178. If the process of driving the belt to the sentence beginning position has been completed by this time, i.e., if latch 181 has been reset, this input passes through And circuit 182 to set latch 190. Otherwise, this latch is set when latch 181 is reset. The setting of latch 190 provides an output on line 193 to drive the belt forward. Latch 190 is reset when latch 181 is set.

Figures 6, 7:
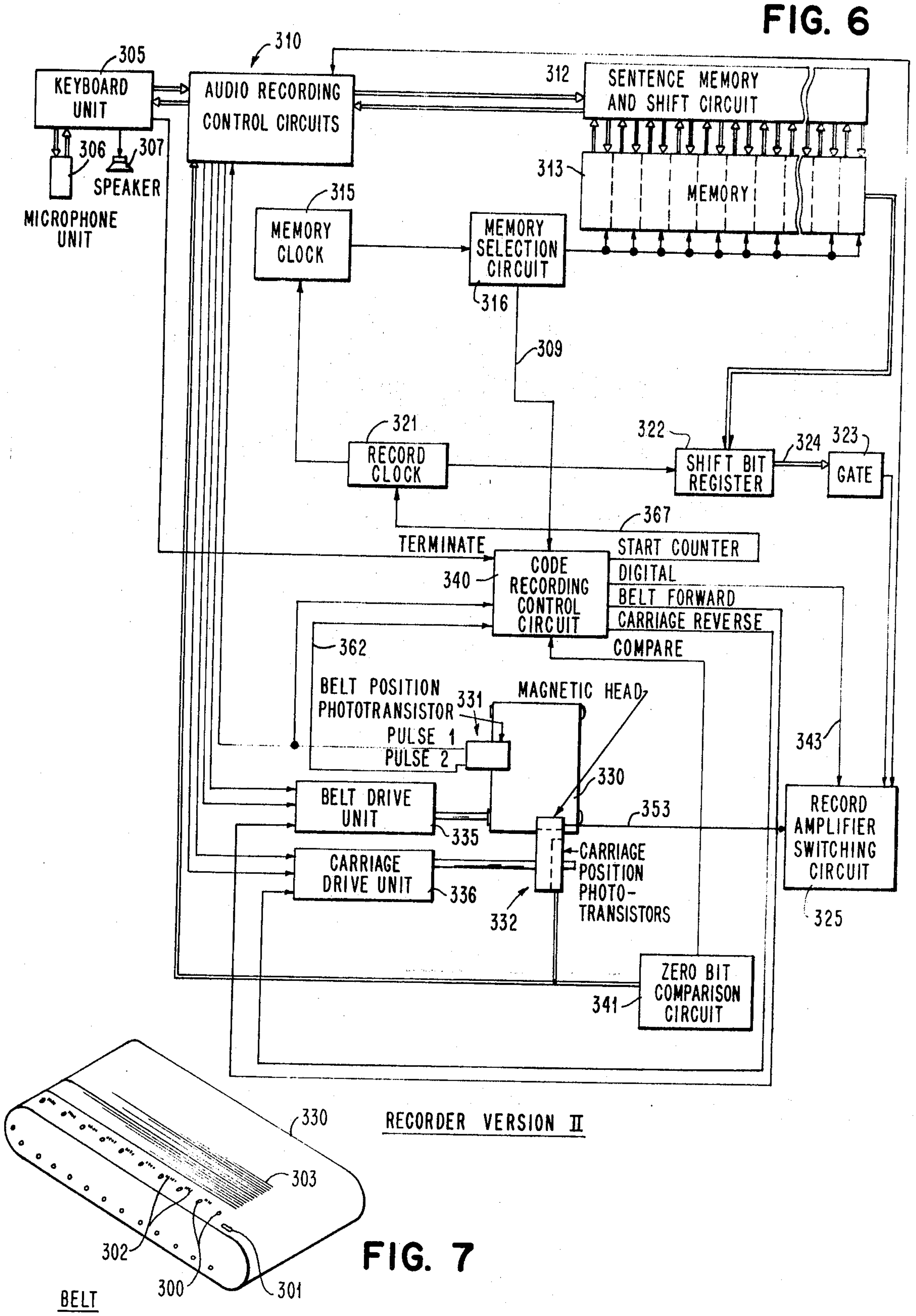
FIG. 6 is another version of a dictation system utilizing the magnetic medium shown in FIG. 7 and having provision for storing the digital information representative of the preferred sequence of accessing of the randomly recorded sentences.

FIG. 6 is a block diagram of a second version of the recorder, which is similar to the first version shown in FIG. 1, except for the fact that sentence location codes are recorded magnetically on a track on belt 330 rather than on a separate card medium as previously described. With this version, when the dictator pushes the "Terminate" button, the carriage is moved to a track reserved for digital recording. Codes are then automatically recorded during a belt revolution. Components 305 through 321 are used to load shift bit register 322 with sentence location codes in the order of the dictator's final arrangement as described for the corresponding components in FIG. 1. The outputs of the memory are gated into shift bit register 322 where it is clocked out through gate circuit 323. This information is fed serially to an amplifier circuit 325 to be recorded on the belt. Timing control over this code recording operation is obtained through the use of a second row of holes in the belt sensed by a second belt position phototransistor. The position on the digital track of the belt at which a code recording operation should begin is indicated by one of these holes. During the code recording operation, the pulse on line 362 resulting from the passing of these holes under the associated phototransistors are fed through control circuit 340 to line 367, which starts the record clock 321 and the memory clock 315. The finish pulse on line 309 from memory selection triggers 316 is used to reset the latches in the code recording circuit 340 after the last code has been recorded.

FIG. 7 shows the belt 330 recorded by the device shown in FIG. 6. Digital codes 302 representing the locations of sentences recorded on audio tracks 303 are magnetically recorded in a special track in positions indicated by holes 300. Hole 301 indicates the belt position for starting all sentences as previously described. The code for the location of the first sentence in the dictator's final arrangement is recorded at the position indicated by the first hole 300 following hole 301 and each succeeding sentence location from this arrangement is recorded at the position indicated by each succeeding hole 300.

Figure 8:
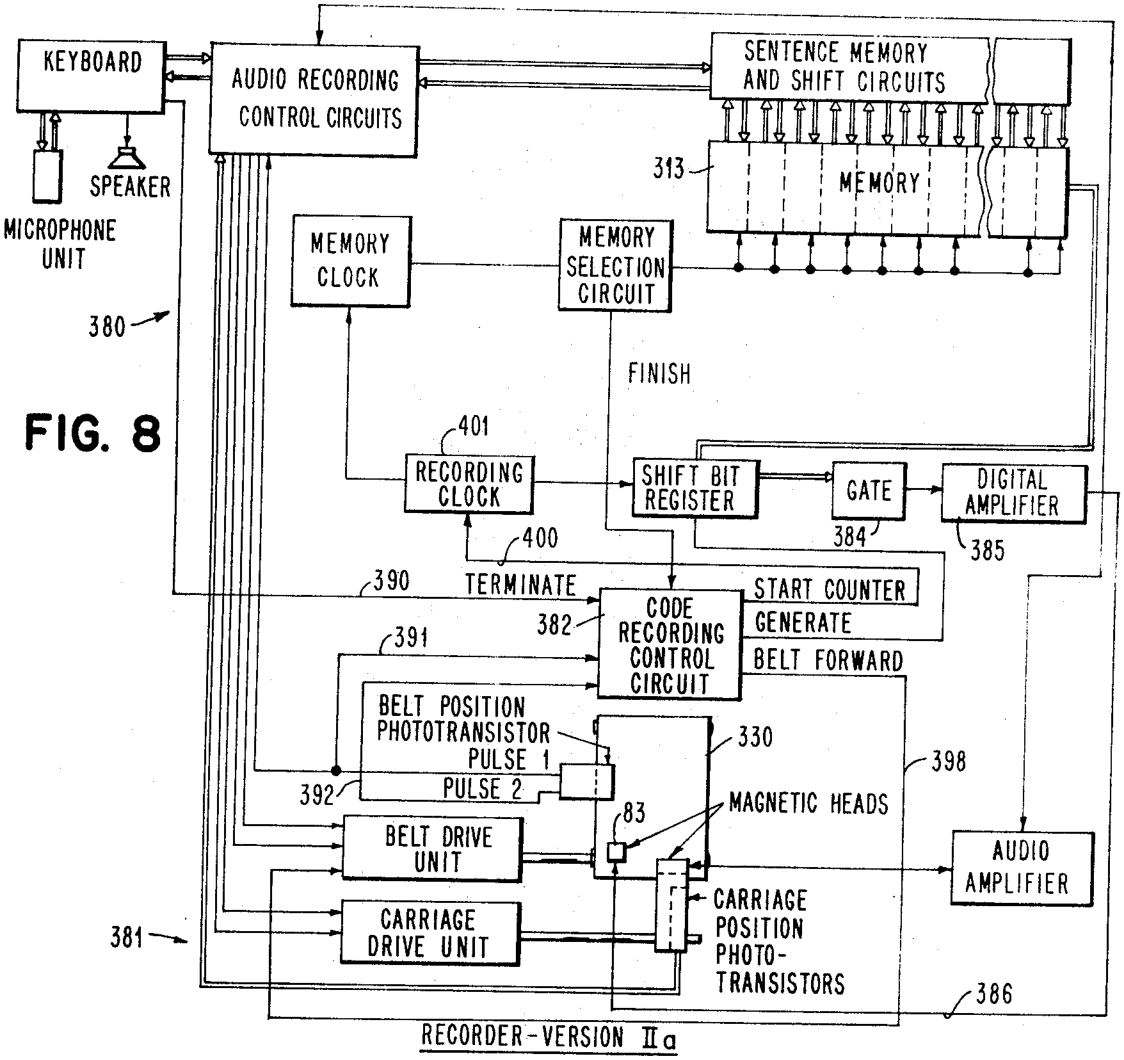
FIGS. 8 and 9 illustrate another recording system and an associated control circuit for recording sentence segments in a random fashion, for storing digital information representative of the preferred sequence of segments and with provision for recording the digital information directly on the magnetic belt medium by using a separate magnetic head.

FIG. 8 is a block diagram for an alternate recorder similar to that shown in FIG. 6 except for the fact that a separate stationary magnetic head 83 is used to record the digital codes required. The output of gate 384 is fed directly into digital amplifier 385 which drives digital magnetic head 83. A digital track is thus recorded on the belt as shown in FIG. 7.

Figure 9:
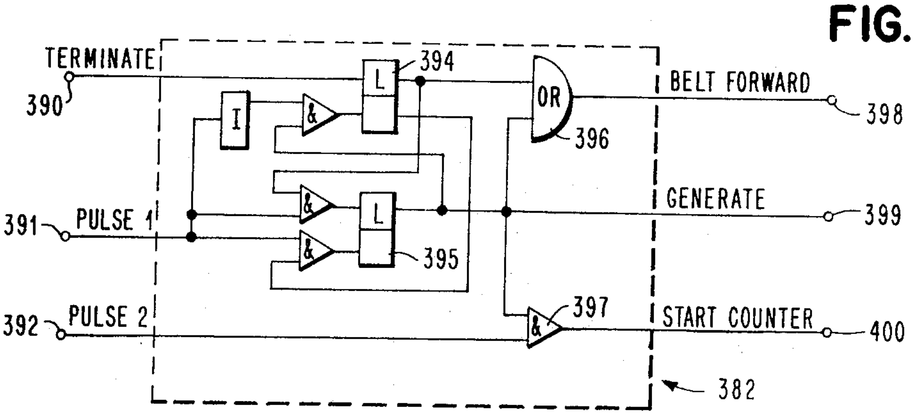

FIG. 9 shows the code recording control circuit used in the machine shown in FIG. 8. When the terminate button is depressed, line 390 from the keyboard unit is activated, setting latch 394 to drive the belt in the forward direction through line 398. Line 391 is activated when hole 301 on belt 330 (see FIG. 18) passes under its associated phototransistor, indicating that the code recording procedure should begin the next time a hole 300 on the belt passes under its associated phototransistor, activating line 392. Therefore, with latch 394 set, a pulse on line 391 sets latch 395, conditioning "and" circuit 397 so subsequent pulses on line 392 are passed through to line 400, which starts the recording clock 401.

Figure 10:
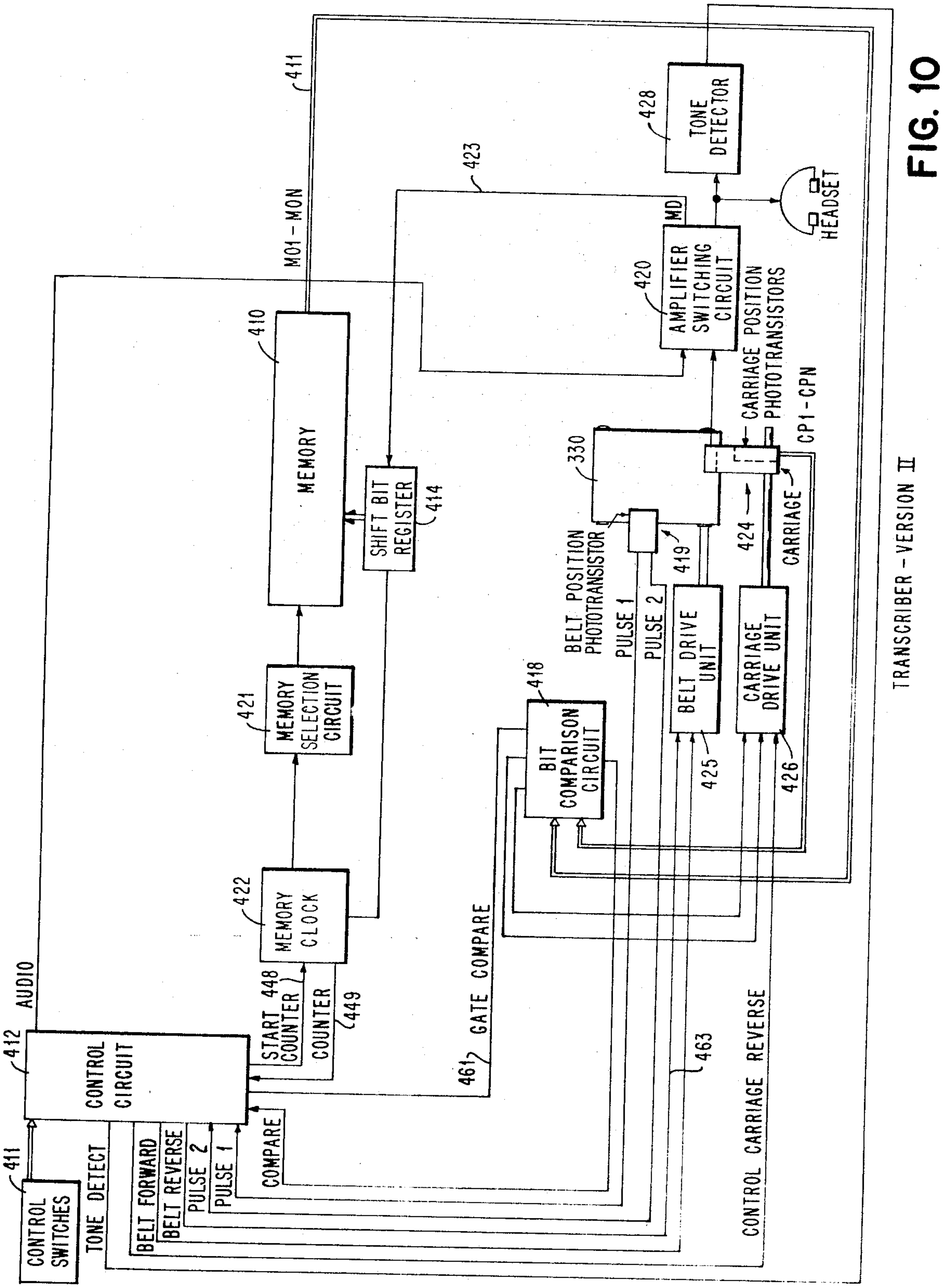
FIG. 10 represents another transcriber system for utilizing a magnetic belt medium having randomly recorded sentence segments thereon as generated in either of the recording systems of FIGS. 6 or 8. The system of FIG. 10 includes a memory for storing the digital information representative of segment sequences.

FIG. 10 shows a transcriber designed to use a belt 330 upon which digital codes have been placed in a single track, as shown in FIG. 7, by either of the devices shown in FIGS. 6 and 8. After the belt 330 is placed in the machine, carriage 424 is moved so that the magnetic head is positioned to read the digital codes into memory 410 during a single belt revolution. These codes stored in the memory are then used in a manner analogous to the codes punched in card 122 as described in reference to FIG. 4 to locate audio tracks on belt 330 so that audio information may be played back in the order of the dictator's final arrangement under control of the secretary.

Memory 410 has registers equal in number to the number of tracks on belt 330. Digital codes are read into memory and stored in the proper order queuing as previously described, i.e., the first memory register stores the location of the first sentence in the dictator's final arrangement, and each succeeding memory register stores the location of each successive sentence in this arrangement.

Digital codes to be read into memory are fed from the digital amplifier connected to the magnetic head by amplifier switching circuit 420 through line 423 to bit shift register 414 which functions with the memory clock 422 and memory selection circuit 421 to deserialize the digital information as required to set latches in the registers of memory 410.

During the subsequent operation of the memory with the playback of audio information, digital codes are fed on lines 411 to bit comparison circuit 418. Similarly, codes representing the carriage position are fed to bit comparison circuit 418. Bit comparison circuit 418 determines the direction in which the carriage should be moved and also determines when the code from the carriage position phototransistors matches the code from memory 410, i.e., when the carriage motion should be stopped by resetting the latches in bit comparator circuit 418.

Figures 11, 12:
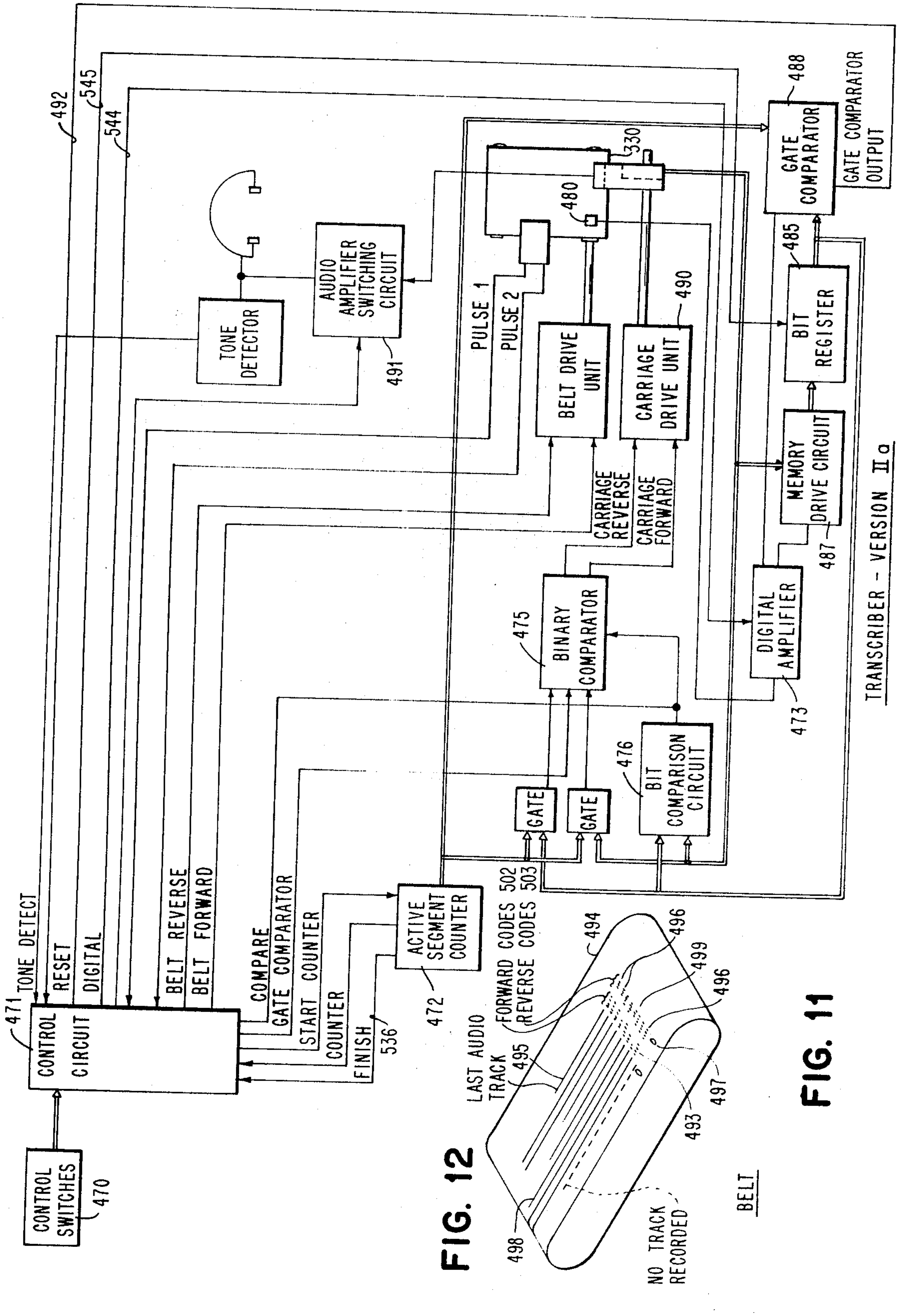
FIG. 11 is still another transcriber system making use of a separate magnetic head for reading the digital codes from the magnetic belt medium of FIG. 7 as well as the magnetic media of FIG. 12.

FIG. 11 shows an alternate transcriber arrangement II*a* which uses a permanently mounted magnetic head 480 to read digital codes from the belt recorded as described in reference to FIG. 7. This digital information is read continuously during the playback of audio information, eliminating the need for reading of the entire track before audio information is played back and eliminating the need for a memory unit 410 capable of storing a large quantity of digital information as described in reference to FIG. 10. Belt 330 is first driven forward to read the first digital code into bit register 485 by means of memory drive circuit 487. Bit comparison circuit 476 which operates as described previously drives the carriage to the position in which the first sentence, as defined by the dictator's final arrangement, is recorded. During the playback of audio information through audio amplifier 491, digital codes from digital amplifier 473 are fed to gate comparator circuit 488 which compares these codes as they are read with the output of bit register 485. An output from the gate comparator on line 492 is achieved whenever the code bit being read from the belt fails to agree with the corresponding bit from bit register 485. If no such output occurs by the time the code reading operation is completed as indicated by the activation of line 493 from active segment counter 472, the code which has been read corresponds to the code stored in bit register 485. This means that the next code on the digital track represents the location of the next sentence in the dictator's arrangement. Line 545 from control circuit 471 to bit register 485 is then activated, resetting the bit register. Line 544 from the control circuit to digital amplifier switching circuit 473 is then activated with the reading of the next digital code so that this code is read into the bit register.

When a tone indicating the end of a sentence is detected, the carriage is moved to the location of the next sentence which is digitally stored in the bit register.

Control circuit 471 contains means for storing whether or not the bit register 485 has been set during the reading of an audio track. If the audio information recorded on this track is so short that this operation has not occurred when a tone is detected, the forward driving of the belt is continued until the operation occurs. The carriage is then driven to the next sentence location as previously described. If the secretary depresses the Forward button after the code for the next sentence has been placed in the bit register 485, the machine proceeds to the next sentence. If she depresses the Forward button before the code for the next sentence has been placed in the bit register 485, the belt continues to move in the forward direction until the register is so set before proceeding to the next sentence. If the secretary depresses the Repeat button, the machine returns immediately to the beginning of the sentence to which she is listening. If the code for the next sentence has not been placed in the register, it then proceeds normally. However, if the code has been placed in the register, the control circuit prevents the placement of a new code in the register to avoid skipping the next sentence. If the secretary depresses the Reverse button and the code for the next sentence has not been placed in the bit register, the machine continues its operation of the belt until a comparison is reached between the code stored in the bit register 485 and a code read from the digital track. The belt is then stopped and driven in the reverse direction over the code that has just been read to the beginning of the preceding code. The belt is then again driven forward while this preceding code is read into the bit register 485. The carriage is then driven to the position indicated by the code in the bit register. On the other hand, if the secretary depresses the repeat button and if the code for the next sentence has been read into the bit register, the belt is driven in reverse to the starting position for sentences. It is then driven forward until a comparison is reached between the code in bit register 485 and a code read from the belt. Then the belt is driven in reverse to the beginning of the second preceding code. The belt is then driven again forward while this code is read into the bit register. The carriage is then driven to the position indicated by this code.

FIG. 12 shows a different arrangement in which digital information may be recorded on belt 494. Audio information is arranged in sentence tracks 495 as previously described. The first digital code 493 recorded one track to the left of the audio tracks indicates the position of the first sentence on the belt as described in the dictator's final arrangement. Each succeeding ones of the codes 496 are associated with one of the audio tracks 495. Each of these codes gives the location of the previous and next sentence according to the dictator's final arrangement. A hole 497 in the belt indicates the position at which digital codes are started.

Figure 13:
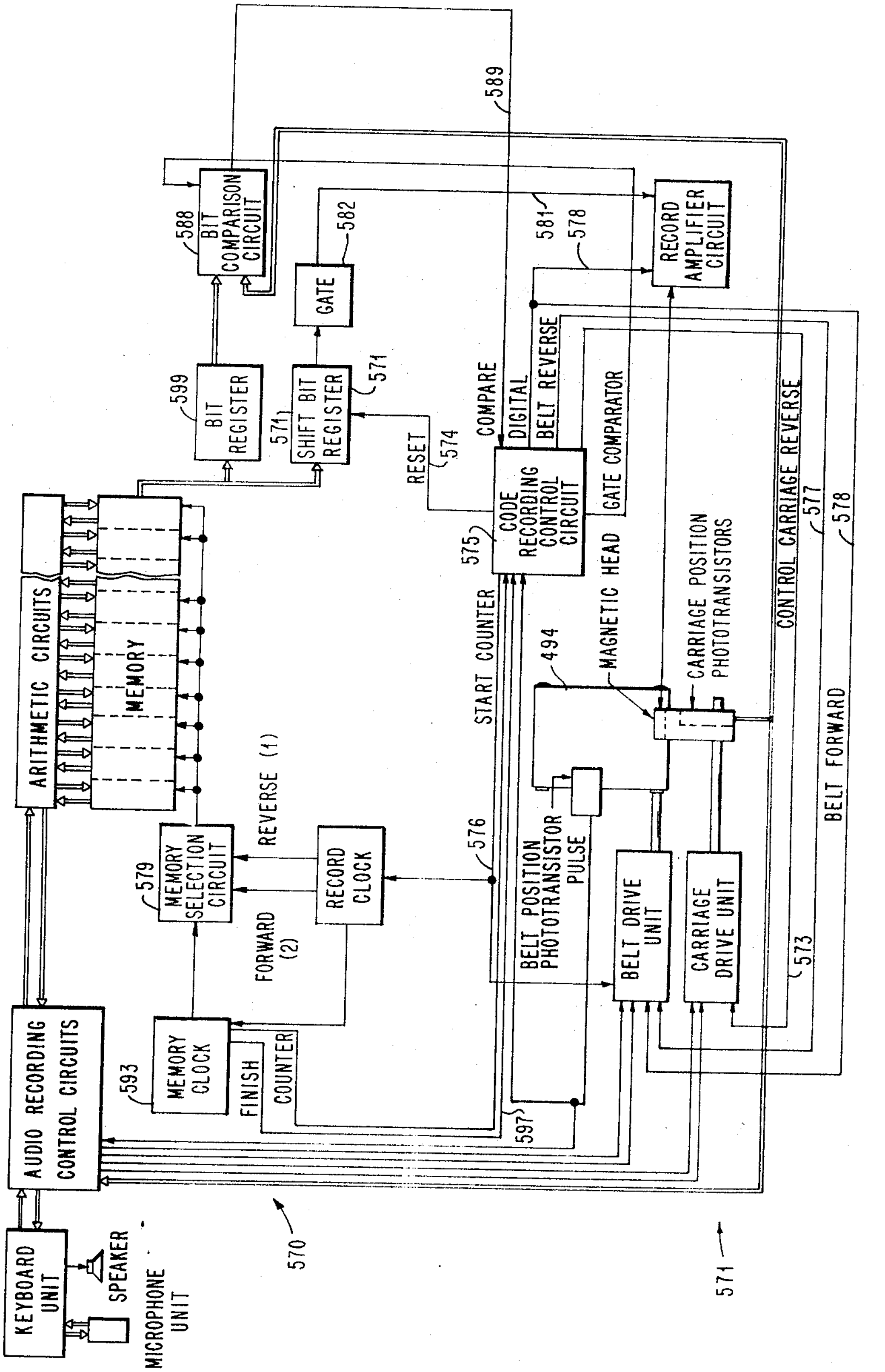
FIG. 13 illustrates a recording system for recording digital information on a belt as arranged in FIG. 12 following a recording of sentence segments in any random order to indicate a preferred transcribing sequence.

FIG. 13 is a block diagram for the device used to record a belt as shown in FIG. 12. This device contains elements 570 used as previously described in reference to the other recorder units to operate shift bit register 571 and elements 572 used as previously described in reference to transcriber units to move the carriage to sentence position in the order to the dictator's final arrangement. When the terminate button on the keyboard unit is depressed, code recording control circuit 575 first moves the carriage to its extreme left position 493, as shown in FIG. 12, by means of line 576, and starts the record clock as shown before. The first code placed in the bit register as previously described represents the location of the first sentence in the dictator's arrangement. This code is then recorded in the extreme left track. Bit register circuit 599 is now used to move the carriage to the position indicated by the code stored in bit register 599 that is to the position of the first sentence in the dictator's arrangement, i.e., audio track 3 designated 498 in FIG. 12.

The memory is stepped backward one step which sends a stop code 499, as shown in FIG. 12, into the bit shift register 471 since the memory was in the first position to start with. This code is then shifted into the record amplifier and onto the media following when the belt is positioned beneath photocell A which detects the start code sequence as described before. Next the bit register 599 is restored and the memory is stepped twice forward and the code identifying the next audio track in the preferred sequence is moved into the bit register 599 and bit shift register 571. Without pause, the record amplifier continues by recording the code identifying the next audio track to be transcribed. Following this, the head is again moved to the location registered in the bit shift register 599, the memory is stepped back once and forward twice recording both codes preceding the audio information. This continues until the memory is completely empty. A stop code is recorded prior to the audio in the last audio track recorded, as shown in FIG. 12. What results from this coded arrangement is the fact that in any audio track the code address is available for either forward stepping to the next segment or reverse stepping to the previous segment.

Figure 14:
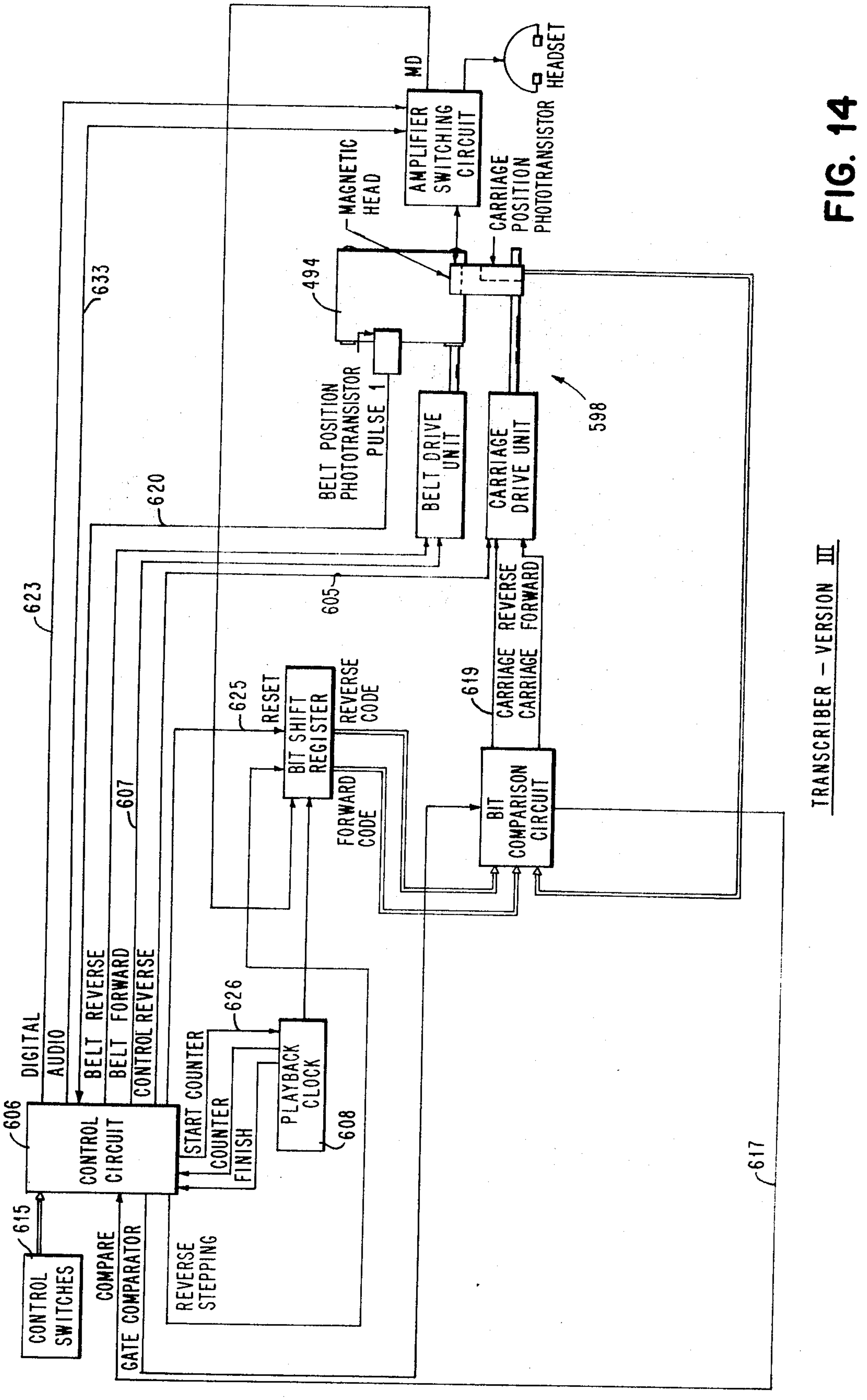
FIG. 14 shows still another transcribing system designed particularly to use the magnetic belt medium shown in FIG. 12.

FIG. 14 is a block diagram of the transcriber unit designed to use digital codes recorded in the fashion shown in FIG. 12 by the recorder shown in FIG. 13. When belt 494 is placed in the machine as shown, the carriage is first driven to its extreme left position by means of line 605 from control circuit 606. The belt is then driven forward by means of line 607 while the playback clock 608 operates as previously described with amplifier switching circuit to set latches in bit shift register 610 to conditions corresponding to the digital code representing the location of the first sentence in the dictator's final arrangement as this code is read through the digital amplifier and amplifier switching circuit 611, which is similar to that shown in FIG. 26. The outputs of bit register 610 and the carriage position phototransistors are then fed to bit comparison circuit 596 for use as previously described so that the carriage is driven to the position represented by the code stored in the bit register. The bit shift register is reset. The belt is then driven forward by means of line 607 from control circuit 606, while the digital code representing the location of the preceding and next sentence according to the dictator's arrangement is read into the bit shift register and while audio information is played back. The detection of a tone indicating the end of a sentence or the depression of the forward switch causes the device to drive the carriage to the position indicated by the Forward code stored in the bit register and to play back the next sentence as described. The reverse function proceeds exactly as the forward function except that the portion of the code representing the previously transcribed sentence, reverse code 503, as shown in FIG. 12, is used to position the carriage to the previous segment rather than the last. The depression of the repeat button causes the machine to play back audio from the beginning of the sentence being heard. A tone detector is not used as previously described to make sure that the secretary has time to depress the repeat button before the machine proceeds to the next sentence, from which it cannot go back. She must depress the forward button before the machine thus proceeds.

While the invention has been particularly shown and described with reference to several preferred embodiments thereof, it will be understood by those skilled in the art that the foregoing and other changes in form and detail may be made therein without departing from the spirit and scope of the invention.

What is claimed is:

1. A dictation system for recording signals on a record medium, comprising:

a transducer;

means mounting said medium in a signal-transducing relation with said transducer;

means for relatively moving said transducer and said medium to trace a plurality of independent signal paths in said medium;

means for randomly selecting in any order individual signal paths on said medium for recording of signals by said transducer;

means for receiving and converting audio signals and providing them to said transducer for recording in a selected signal path on said medium;

means for generating coded signal sets identifying each signal path on said medium;

storage means for storing said coded signal sets in a sequence indicative of a preferred sequence of playback of the individual signal paths in said medium, said preferred sequence being ordered in a non-sequential arrangement;

means for transferring said coded signal sets from said storage means for utilization; and means responsive to said transferred coded signal sets to record said signal on an auxiliary record medium in accordance with said signal sets and in said preferred sequence.

2. A transcribing system for reproducing audio signals previously recorded in a plurality of signal paths on a record medium and in accordance with a preferred sequence, comprising:

a transducer;

means mounting said medium in signal-transducing relation with said transducer;

means for relatively moving said transducer and said medium to trace a plurality of independent signal paths on said medium;

means for generating in said preferred sequence a series of coded signal sets identifying said recorded signal paths on said medium, wherein said coded signal sets are stored in an auxiliary record medium in said preferred sequence;

means controlled by said coded signal sets for selecting in said preferred sequence individual signal paths on said medium for reproduction of said audio signals by said transducer, said preferred sequence being ordered in a non-sequential arrangement; and means for reading said auxiliary record medium in order to derive the coded signal sets therein for use by said generating means.

3. A transcribing system for reproducing audio signals previously recorded in a plurality of signal paths on a record medium and in accordance with a preferred sequence, comprising:

a transducer;

means mounting said medium in a signal-transducing relation with said transducer;

means for relatively moving said transducer and said medium to trace a plurality of independent signal paths on said medium;

means for generating in said preferred sequence a series of coded signal sets identifying said recorded signal paths on said medium, said preferred sequence being ordered in a non-sequential arrangement;

means controlled by said coded signal sets for selecting in said preferred sequence individual signal paths on said medium for reproduction of said audio signals by said transducer;

storage means for storing said coded signal sets in a sequence indicative of a preferred sequence of playback of the individual signal paths on said medium, wherein said coded signal sets are initially stored in an auxiliary record medium associated with said audio record medium;

means for transferring said stored signal sets to said generating means in said preferred sequence;

said means for transferring further comprising:

means for reading said auxiliary record medium and transferring said stored coded signal sets to said storage means.

4. A transcribing system for reproducing audio signals previously recorded in a plurality of signal paths on a record medium and in accordance with a preferred sequence, comprising:

a transducer;

means mounting said medium in a signal-transducing relation with said transducer;

means for relatively moving said transducer and said medium to trace a plurality of independent signal paths on said medium;

means for generating in said preferred sequence a series of coded signal sets identifying said recorded signal paths on said medium, said preferred sequence being ordered in a non-sequential arrangement;

means controlled by said coded signal sets for selecting in said preferred sequence individual signal paths on said medium for reproduction of said audio signals by said transducer;

means positioned for operator control to initiate operation of said system;

forward and reverse control means for initiating relative forward and reverse movement of said transducer with respect to said medium, and repeat means controlled by said operator for relatively restoring said transducer means to the beginning of any individual signal path in order to enable repeated playback of the audio signals therein.

* * * * *